(12) United States Patent
Takata

(10) Patent No.: US 12,199,850 B2
(45) Date of Patent: Jan. 14, 2025

(54) COMMUNICATION SYSTEM, MASTER DEVICE, SLAVE DEVICE AND COMMUNICATION METHOD

(71) Applicant: MegaChips Corporation, Osaka (JP)

(72) Inventor: Akihiro Takata, Osaka (JP)

(73) Assignee: MEGACHIPS CORPORATION, Osaka (JP)

( * ) Notice: Subject to any disclaimer, the term of this patent is extended or adjusted under 35 U.S.C. 154(b) by 144 days.

(21) Appl. No.: 18/115,002

(22) Filed: Feb. 28, 2023

(65) Prior Publication Data

US 2023/0353471 A1  Nov. 2, 2023

(30) Foreign Application Priority Data

May 2, 2022 (JP) .................................. 2022-075933

(51) Int. Cl.
| | | |
|---|---|---|
| *H04B 10/00* | (2013.01) | |
| *H04B 10/079* | (2013.01) | |
| *H04L 43/0864* | (2022.01) | |
| *H04J 14/00* | (2006.01) | |

(52) U.S. Cl.
CPC ..... *H04L 43/0864* (2013.01); *H04B 10/0793* (2013.01)

(58) Field of Classification Search
CPC ........ H04J 14/08; H04J 14/083; H04J 14/086; H04B 10/272; H04B 10/278
See application file for complete search history.

(56) References Cited

U.S. PATENT DOCUMENTS

| | | |
|---|---|---|
| 2006/0239285 A1 | 10/2006 | Nomura et al. |
| 2013/0315595 A1* | 11/2013 | Barr .................... H04Q 11/0067 398/67 |
| 2015/0093108 A1* | 4/2015 | Hirth .................. H04Q 11/0067 398/34 |
| 2021/0167855 A1 | 6/2021 | Takahashi et al. |

FOREIGN PATENT DOCUMENTS

| | | |
|---|---|---|
| JP | 2006-246262 A | 9/2006 |
| JP | 2020-027990 A | 2/2020 |
| WO | 2020/194554 A1 | 10/2020 |

* cited by examiner

*Primary Examiner* — Daniel G Dobson
(74) *Attorney, Agent, or Firm* — XSENSUS LLP

(57) ABSTRACT

A master device transmits a first control signal including TS0(S) to a slave device and transmits a first data signal including TS0(M) to the master, the slave sets a point in time in the slave to T0(S) in time when the first control signal is received and transmits a second data signal including TS1(S) to the master, the master receives the second data signal and subtract TS1(S) from TS2(S) to calculate a round-trip delay time RTTs, and receives the first data signal and subtract TS0(M) from TS1(M) to calculate a round-trip delay time RTTm, the master transmits a data signal to the slave at a point in time that is obtained by TA−RTTm, and the slave puts the slave in a data receivable state at a point in time that is obtained by TA−RTTs.

14 Claims, 13 Drawing Sheets

COMMUNICATION SYSTEM, MASTER DEVICE, SLAVE DEVICE AND COMMUNICATION METHOD

CROSS-REFERENCE TO RELATED APPLICATION

The present application is based on, and claims priority from Japanese Patent Application Serial Number 2022-075933 filed May 2, 2022, the disclosure of which is hereby incorporated by reference herein in its entirety.

BACKGROUND

Technical Field

The present invention relates to a communication system that uses an optical network, a master device and a slave device used in the communication system and a communication method.

Description of Related Art

An optical network is used as one of solutions for an increase in speed and capacity of communication. In a case in which a plurality of communication devices communicate with use of an optical network, these communication terminals can share an optical fiber with use of TDMA (Time Division Multiple Access). At this time, in order to avoid collision and loss of signals in the optical network, it is necessary to accurately switch the timing for transmission and reception of signals among communication devices.

In regard to the IEEE802.3av (10G-EPON) standard with which a plurality of ONUs (Optical Network Units) share an optical network, the protocol (Multi-Point Control Protocol: MPCP) that controls the timing for transmission by the ONUs is used to avoid collision of signals. With the MPCP, in regard to an upstream signal transmitted from an ONU to an OLT (Optical Line Terminal), the timing for transmission is controlled by the ONU, which transmits the signal.

JP 2020-27990 A discloses a network technology in which a C-Plane for transmission of electric signals and a D-Plane for transmission for optical signals are combined.

SUMMARY

JP 2020-27990 A discloses the technique for controlling transmission or reception of a data signal on the D-plane by transmission of a control signal with use of the C-Plane from a master device to each slave device. In each of the master device and the slave device, a delay period of time for processing the signal is generated. It is desirable to control transmission and reception with higher accuracy by taking this delay period of time into consideration.

An object of the present invention is to accurately control transmission and reception in order to avoid collision and loss of signals in a communication system that uses an optical network.

A communication system according to one aspect of the present invention that performs communication between a master device and a slave device with use of TDMA includes a control network for transmission of a control signal that connects the master device and the slave device to each other, and an optical network for transmission of a data signal that is reconnected from the master device to the master device through the slave device, wherein the master device includes a master TDMA control circuit, a master control transmission circuit that transmits a first control signal including a time stamp TS0(S) of a point T0(S) in time to the slave device with use of the control network, and a master data transmission circuit that transmits a first data signal including a time stamp TS0(M) of a point T0(M) in time to the master device with use of the optical network, the slave device includes a slave TDMA control circuit that sets a point in time in the slave device to the T0(S) when receiving the first control signal, and a slave data transmission circuit that, at a point T1(S) in time, transmits a second data signal including a time stamp TS1(S) of the point T1(S) in time to the master device with use of the optical network, the master TDMA control circuit acquires a point T2(S) in time at which the second data signal is received and its time stamp TS2(S) and subtracts the time stamp TS1(S) from the time stamp TS2(S) to calculate a first round-trip delay time, and acquires a point T1(M) in time at which the first data signal is received and its time stamp TS1(M) and subtracts the time stamp TS0(M) from the time stamp TS1(M) to calculate a second round-trip delay time, the master data transmission circuit transmits a data signal to the slave device at a point in time that is obtained when the second round-trip delay time is subtracted from a point TA in time that is allocated by the master TDMA control circuit, and the slave device puts the slave device in a data receivable state at a point in time that is obtained when the first round-trip delay time is subtracted from the point TA in time.

The present invention is also directed to a master device and a slave device used in the above-mentioned communication system. Further, the present invention is also directed to a communication method.

Other features, elements, characteristics, and advantages of the present disclosure will become more apparent from the following description of preferred embodiments of the present disclosure with reference to the attached drawings.

DETAILED DESCRIPTION

A communication system, a master device, a slave device and a communication method according to embodiments of the present invention will be described below with reference to the attached drawings.

[1] First Embodiment (1) Overall Configuration of Communication System

Figure 1:
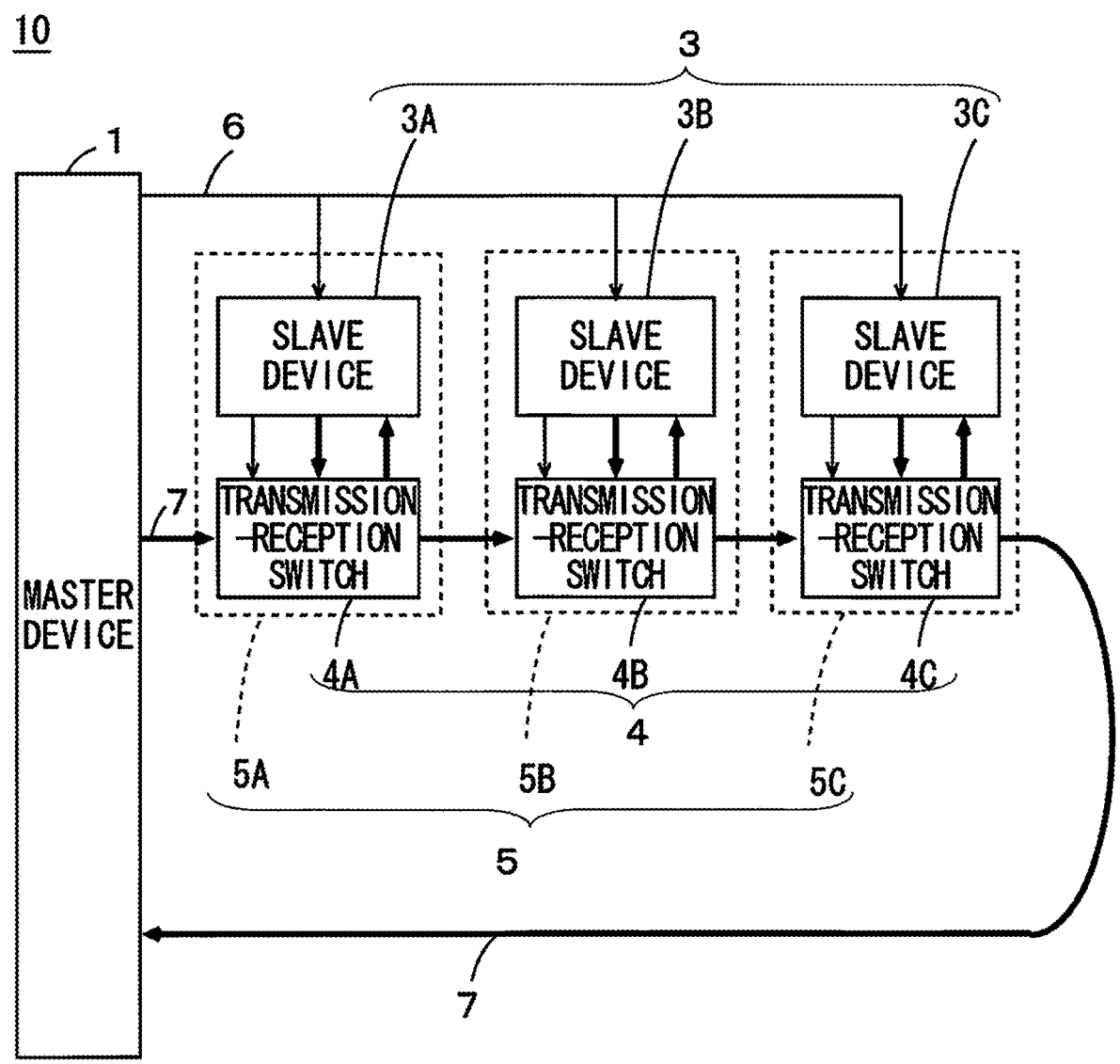
FIG. 1 is the overall view of a communication system according to a first embodiment.

FIG. 1 shows the overall configuration of the communication system 10 according to a first embodiment. The communication system 10 includes a master device 1 and a plurality of slave devices 3. In the example of FIG. 1, the communication system 10 includes the three slave devices 3A, 3B, 3C. Transmission-reception switches 4A, 4B, 4C are connected to the slave devices 3A, 3B, 3C, respectively. The slave device 3A and the transmission-reception switch 4A constitute a gateway 5A, the slave device 3B and the transmission-reception switch 4B constitute a gateway 5B, and the slave device 3C and the transmission-reception switch 4C constitute a gateway 5C. In the following description, when the configurations and operations common among the slave devices 3A to 3C, the transmission-reception switches 4A to 4C and the gateways 5A to 5C are described, they are suitably described as a slave device 3, a transmission-reception switch 4 and a gateway 5.

The master device 1 and the slave devices 3A to 3C are connected to each other through a control network 6 for transmission of control signals. While the control network 6 uses a network that transmits electrical signals in the present embodiment, an optical network that transmits optical signals may be used as the control network 6. The control network 6 branches at a plurality of branch points and is connected to each of the slave devices 3A to 3C. With such a configuration, a control signal transmitted by the master device 1 through the control network 6 is received by all of the slave devices 3A to 3C.

The master device 1 and the transmission-reception switches 4A to 4C are connected to each other through an optical network 7 for transmission of data signals. That is, the master device 1 and the transmission-reception switches 4A to 4C are connected to each other through an optical fiber. In this manner, in the communication system 10 of the present embodiment, the master device 1 and the plurality of slave devices 3A to 3C share one optical fiber.

In FIG. 1, the control network 6 through which a control signal is transmitted is indicated by the thin lines, and the optical network 7 through which a data signal is transmitted is indicated by the thick lines.

The communication system 10 is used as an in-vehicle network installed in an automobile, for example. In this case, the slave devices 3A to 3C can be used as electronic control units (ECUs) that control respective components of the automobile. With the development of electronic control technology for automobiles, a large number of electronic control units are installed in an automobile. In this case, the large number of slave devices 3 corresponding to electronic control units are installed in an automobile and are connected to the control network 6 and the optical network 7.

(2) Functional Configurations of Master Device and Slave Device

Figure 2:
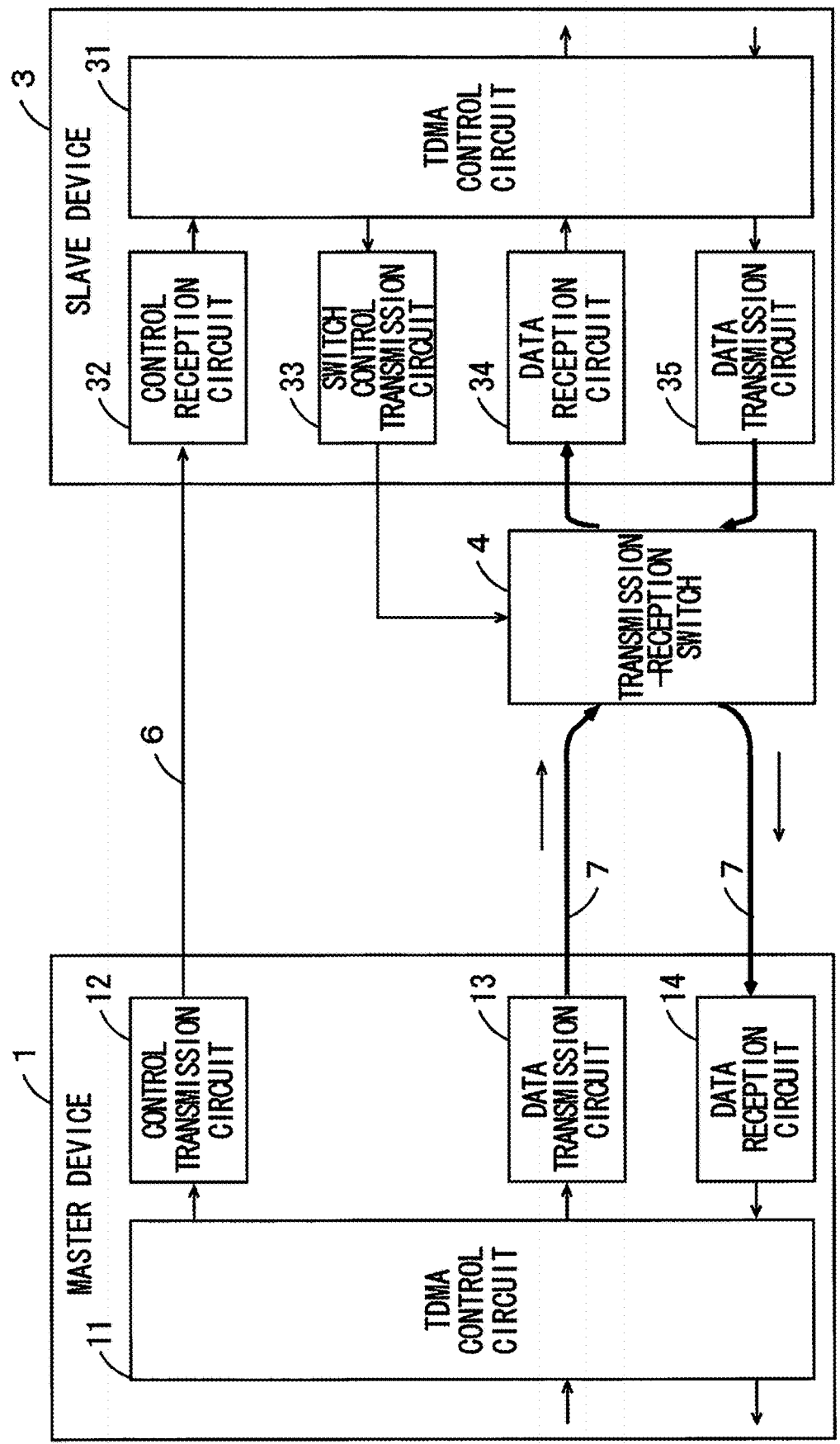
FIG. 2 is a block diagram showing the functional configurations of a master device and a slave device according to the first embodiment.

FIG. 2 is a block diagram showing the functional configurations of the master device 1 and the slave device 3 according to the first embodiment. The master device 1 includes a TDMA control circuit 11, a control transmission circuit 12, a data transmission circuit 13 and a data reception circuit 14.

The TDMA control circuit 11 controls the control transmission circuit 12, the data transmission circuit 13 and the data reception circuit 14 to perform control for performing TDMA in the communication system 10. The control transmission circuit 12 transmits a control signal to the slave device 3 through the control network 6. The data transmission circuit 13 transmits a data signal to the slave device 3 or the master device 1 through the optical network 7. The data reception circuit 14 receives a data signal transmitted from the slave device 3 or the master device 1 through the optical network 7.

The slave device 3 includes a TDMA control circuit 31, a control reception circuit 32, a switch control transmission circuit 33, a data reception circuit 34 and a data transmission circuit 35.

The TDMA control circuit 31 controls the control reception circuit 32, the switch control transmission circuit 33, the data reception circuit 34 and the data transmission circuit 35 to perform control for performing TDMA in the communication system 10. The control reception circuit 32 receives a control signal transmitted by the master device 1 through the control network 6. The switch control transmission circuit 33 controls the switching of the transmission-reception switch 4. The data reception circuit 34 receives a data signal transmitted by the master device 1 through the optical network 7. The data transmission circuit 35 transmits a data signal to the master device 1 through the optical network 7.

In accordance with a switch signal provided from the switch control transmission circuit 33, the transmission-reception switch 4 are switched among three types of states which are a data transmittable state (Talk), a data receivable state (Listen) and a pass state (Thru). When the transmission-reception switch 4 is switched to the transmittable state, a data signal provided from the data transmission circuit 35 can be written into the optical network 7 as an optical signal. When the transmission-reception switch 4 is switched to the receivable state, an optical signal read out from the optical network 7 is provided to the data reception circuit 34. When the transmission-reception switch 4 is switched to the pass state, the transmission-reception switch 4 causes an optical signal flowing through the optical network 7 to pass. The optical signal that has passed through the transmission-reception switch 4 is sent toward the transmission-reception switch 4 of the next slave device 3.

(3) Round-Trip Delay Time Between Master Device and Slave Device

Figure 3:
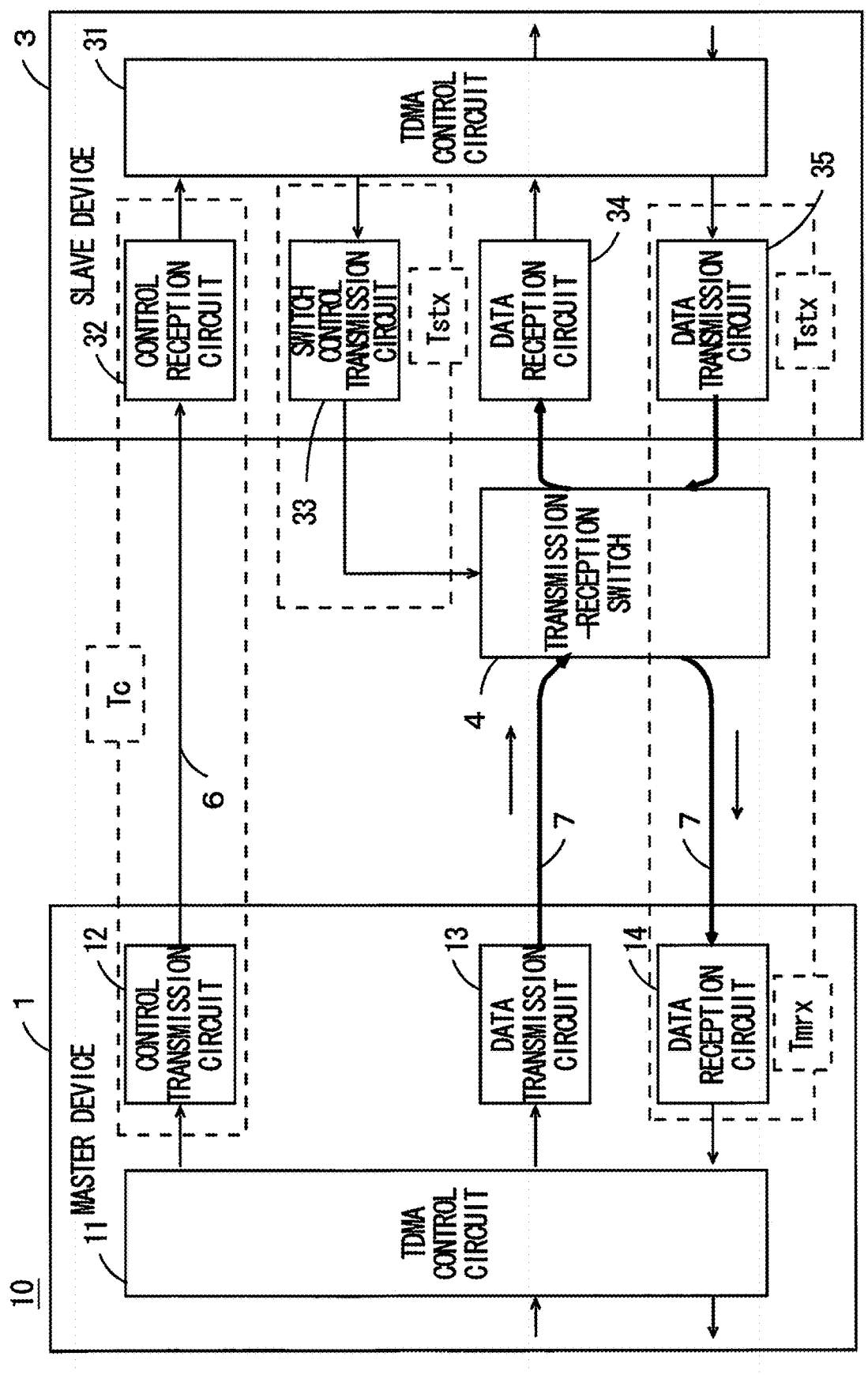
FIG. 3 is a diagram showing the round-trip delay time between the master device and the slave device.

Next, the round-trip delay time between the master device and the slave device (hereinafter referred to as a first round-trip delay time RTTs) will be described. FIG. 3 is a diagram for explaining the first round-trip delay time RTTs. The first round-trip time RTTs is the delay period of time from the time when the master device 1 instructs the slave device 3 to transmit a data signal to the time when the master device 1 receives the data signal transmitted by the slave device 3.

As shown in FIG. 3, the first round-trip delay time RTTs includes three elements which are delay times Tc, Tstx and Tmrx. The delay time Tc is the delay period of time during which a control signal is transmitted from the master device 1 to the slave device 3, and the processing periods of time in the control transmission circuit 12 and the control reception circuit 32 are a dominant term. The delay time Tstx is the delay period of time during which a switch signal is transmitted from the slave device 3 to the transmission-reception switch 4, and the processing period of time in the switch control transmission circuit 33 is a dominant term. Further, the delay time Tmrx+Tstx is the delay period of time during which a data signal is transmitted from the slave device 3 to the master device 1, and the processing time Tstx in the data transmission circuit 35 and the processing time Tmrx in the data reception circuit 14 are dominant terms. In the present embodiment, the processing period of time in the data transmission circuit 35 and the processing period of time in the switch control transmission circuit 33 are presumed as the same time Tstx.

Figure 4:
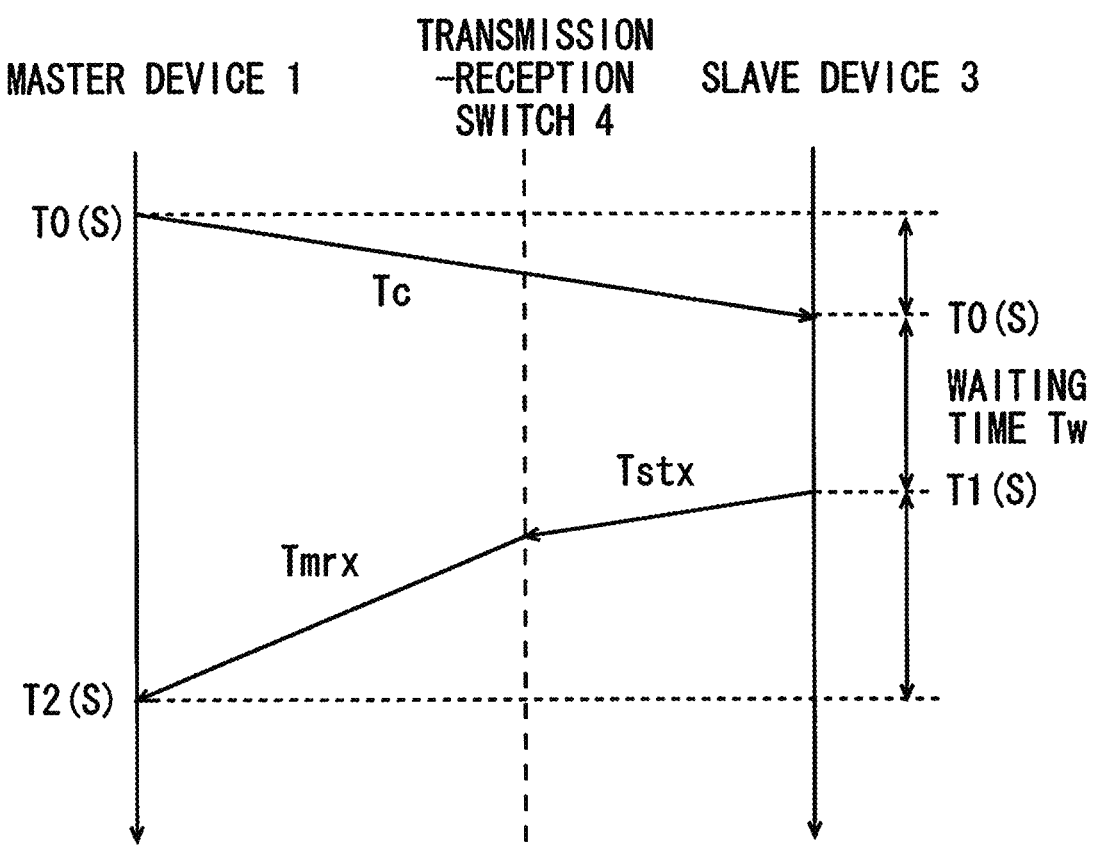
FIG. 4 is a time chart showing the round-trip delay time between the master device and the slave device.

FIG. 4 is a time chart showing the first round-trip delay time RTTs. At a point T0(S) in time, the master device 1 transmits a control signal to the slave device 3. Specifically, the TDMA control circuit 11 instructs the control transmission circuit 12 to transmit a control signal including a time stamp TS0(S) of the point T0(S) in time. The control transmission circuit 12 generates the frame of the control signal including the time stamp TS0(S) and transmits the control signal to the slave device 3. The control signal is sent out to the control network 6. The control reception circuit 32 of the slave device 3 provides the received control signal to the TDMA control circuit 31. When receiving the control signal, the TDMA control circuit 31 sets the local point in time in the slave device 3 to the T0 (S). At this time, the sum of the processing periods of time in the control transmission circuit 12 and the control reception circuit 32 is the delay time Tc. That is, the local point in time in the slave device 3 is delayed by Tc from the point in time in the master device 1.

Subsequently, at a point T1(S) in time, the TDMA control circuit 31 provides a state switching instruction to the switch control transmission circuit 33. The point T1(S) in time is the local point in time in the slave device 3. In response to this instruction, the switch control transmission circuit 33 provides a control signal for switching the transmission-reception switch 4 to the transmittable state (Talk) to the transmission-reception switch 4. A waiting time Tw from the point T0(S) to the point T1(S) in time is the processing period of time in the TDMA control circuit 31. At the point T1(S) in time, the TDMA control circuit 31 instructs the data transmission circuit 35 to transmit a data signal including the time stamp TS1(S) of the point T1(S) in time. In response to this instruction, the data transmission circuit 35 generates the frame of the data signal including the time stamp TS1(S) and provides the data signal to the transmission-reception switch 4. At this time, the processing period of time in the data transmission circuit 35 is the delay time Tstx. Further, the processing period of time in the switch control transmission circuit 33 is also the delay time Tstx.

In response to the instruction provided from the switch control transmission circuit 33, the transmission-reception switch 4 switches the state of the transmission-reception switch 4 to the transmittable state (Talk). Then, the transmission-reception switch 4 transmits the data signal provided from the data transmission circuit 35 to the optical network 7.

The data reception circuit 14 of the master device 1 receives the data signal transmitted from the data transmission circuit 35. The data reception circuit 14 provides the received data signal to the TDMA control circuit 11. The TDMA control circuit 11 acquires a point T2(S) in time at which the data signal is received and its time stamp TS2(S). At this time, the processing period of time in the data reception circuit 14 is the delay time Tmrx.

The TDMA control circuit 11 obtains the first round-trip delay time RTTs by performing the operation in the final line of the following formula.

$$\begin{aligned}RTTs &= Tc + Tstx + Tmrx \\ &= TS2(S) - TS0(S) - Tw \\ &= TS2(S) - TS0(S) - (TS1(S) - TS0(S)) \\ &= TS2(S) - TS1(S)\end{aligned}$$

The TDMA control circuit 11 saves the obtained first round-trip delay time RTTs in a storage included in the master device 1.

(4) Round-Trip Delay Time from Master Device to Master Device

Next, the round-trip delay time from the master device to the master device (hereinafter referred to as a second round-trip delay time RTTm) will be described. FIG. is a diagram for explaining the second round-trip delay time RTTm. The second round-trip delay time RTTm is the delay period of time from the time when the master device 1 transmits a data signal to the master device 1 itself to the time when the master device 1 receives the transmitted data signal. In order to measure the second round-trip delay time RTTm, the transmission-reception switches 4 of all of the slave devices 3 are switched to the pass state (Thru). Thus, the data signal transmitted by the master device 1 passes through the transmission-reception switches 4 of all of the gateways 5 and returns to the master device 1.

Figure 5:
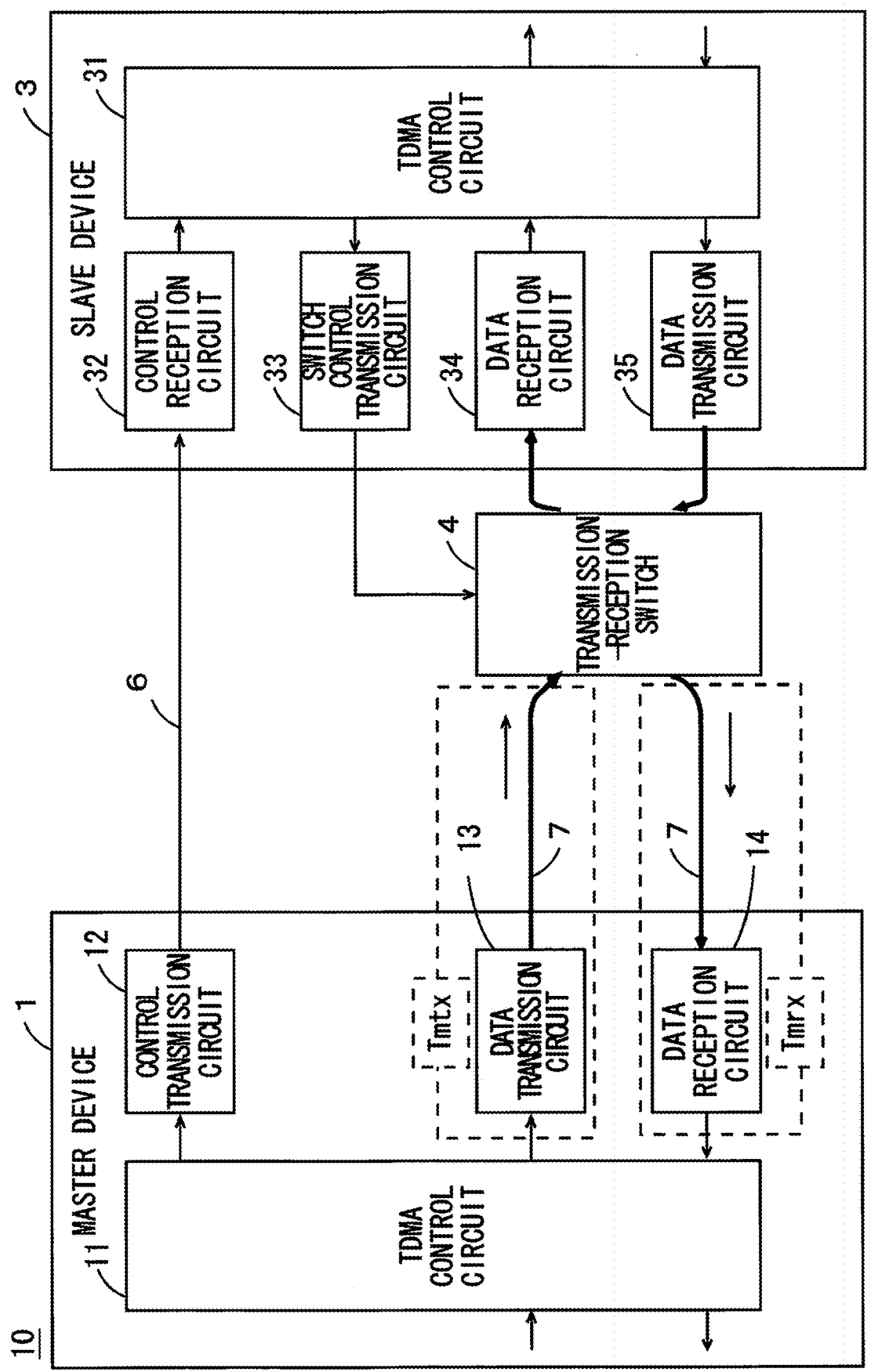
FIG. 5 is a diagram showing the round-trip delay time from the master device to the master device.

As shown in FIG. 5, the second round-trip delay time RTTm includes two elements which are a delay time Tmtx and the delay time Tmrx. The delay time Tmtx is the delay period of time required for the master device 1 to transmit a data signal, and the processing period of time in the data transmission circuit 13 is a dominant term. Further, the delay time Tmrx is the delay period of time required for the master device 1 to receive a data signal, and the processing period of time in the data reception circuit 14 is a dominant term.

Figure 6:
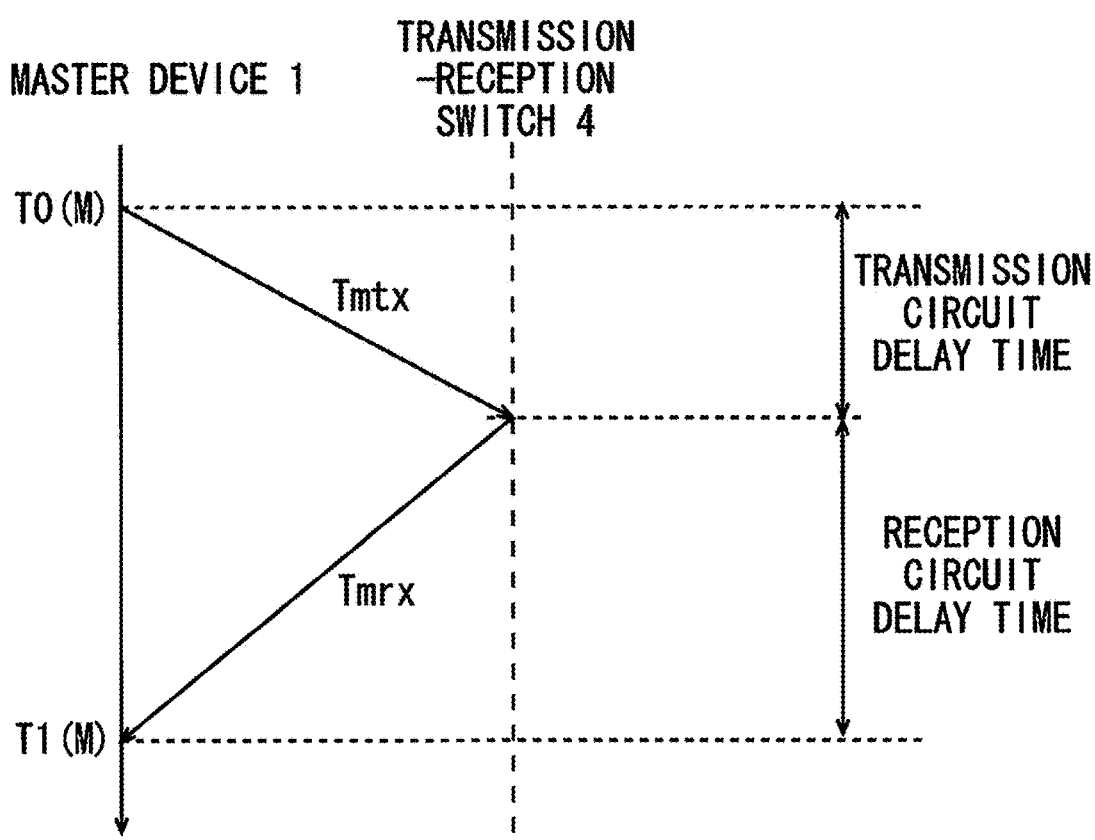
FIG. 6 is a time chart showing the round-trip delay time from the master device to the master device.

FIG. 6 is a time chart showing the second round-trip delay time RTTm. At a point T0(M) in time, the master device 1 transmits a data signal to the master device 1 itself. Specifically, the TDMA control circuit 11 instructs the data transmission circuit 13 to transmit a data signal including a time stamp TS0(M) of the point T0(M) in time. The data transmission circuit 13 generates the frame of the data signal including the time stamp TS0(M) and transmits the data signal to the master device 1. At this time, the processing period of time in the data transmission circuit 13 is the delay time Tmtx.

The data signal transmitted from the data transmission circuit 13 is sent out to the optical network 7. The data signal passes through all of the transmission-reception switches 4 and returns to the master device 1. The data reception circuit 14 of the master device 1 provides the received data signal to the TDMA control circuit 11. The TDMA control circuit 11 acquires a point T1(M) in time at which the data signal is received and its time stamp TS1(M). At this time, the processing period of time in the data reception circuit 14 is the delay time Tmrx.

The TDMA control circuit 11 obtains the second round-trip delay time RTTm by performing the following operation.

$$RTTm = Tmtx + Tmrx = TS1(M) - TS0(M)$$

The TDMA control circuit 11 saves the obtained second round-trip delay time RTTm in the storage included in the master device 1.

(5) Control Procedure of Upstream Communication

Figure 7:
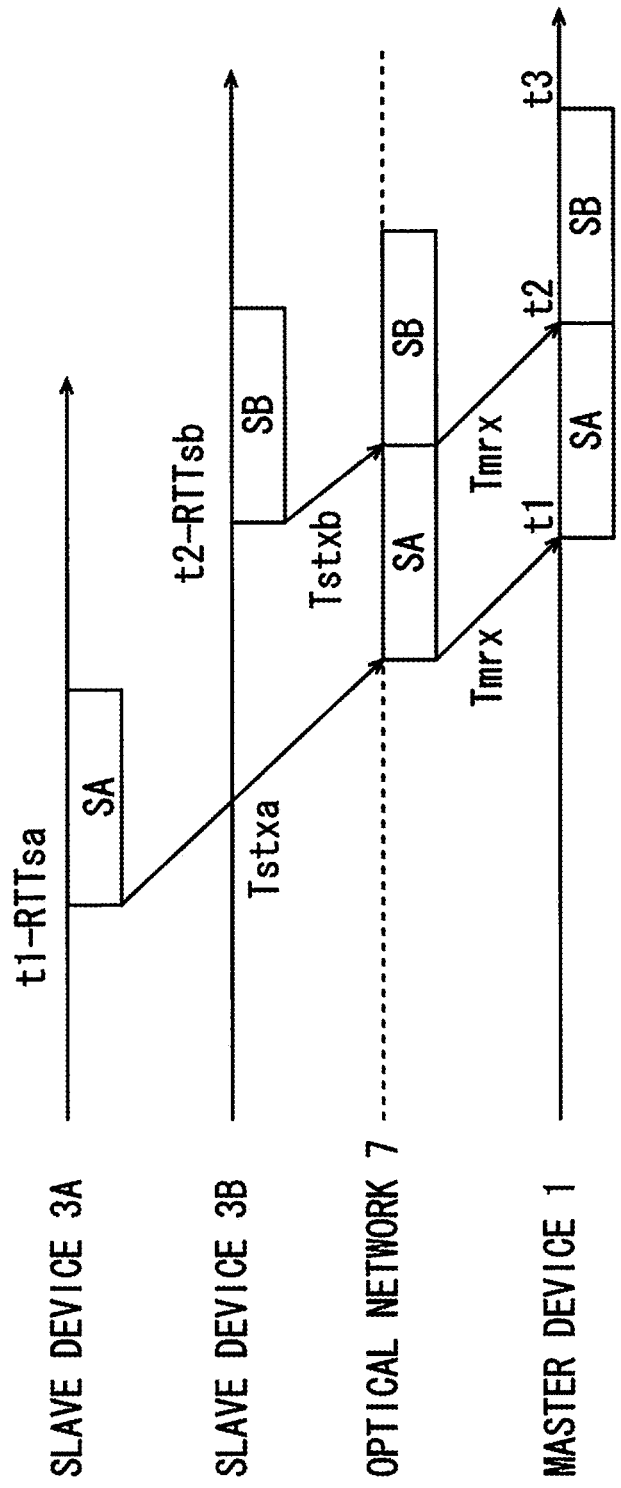
FIG. 7 is a time chart showing the timing for transmission in upstream communication.

Next, the control procedure of upstream communication in which a data signal is transmitted from the slave device 3 to the master device 1 will be described. FIG. 7 is a time chart showing the timing for transmission in upstream communication. In FIG. 7, a symbol SA indicates a data signal transmitted by the slave device 3A, and a symbol SB indicates a data signal transmitted by the slave device 3B.

First, the TDMA control circuit 11 of the master device 1 allocates a point in time at which transmission of a data signal is permitted to each slave device 3. In the example of FIG. 7, the TDMA control circuit 11 allocates the period from a point t1 to a point t2 in time to the slave device 3A and allocates the period from the point t2 to a point t3 in time to the slave device 3B. Specifically, in response to an instruction provided by the TDMA control circuit 11, the control transmission circuit 12 transmits a control signal designating the period from the point t1 to the point t2 in time during which transmission is permitted to the slave device 3A. Similarly, in response to an instruction provided by the TDMA control circuit 11, the control transmission circuit 12 transmits a control signal designating the period from the point t2 to the point t3 in time during which transmission is permitted to the slave device 3B.

Next, the TDMA control circuit 31 of the slave device 3A provides an instruction for switching to the transmittable state (Talk) to the switch control transmission circuit 33 at a point t1−RTTsa in time that is obtained when a first round-trip delay time RTTsa of the slave device 3A is subtracted from the point t1 in time. Further, the TDMA control circuit 31 of the slave device 3A instructs the data transmission circuit 35 to transmit a data signal at the point t1−RTTsa in time. The point t1−RTTsa in time is the local point in time in the slave device 3A. Similarly, the TDMA control circuit 31 of the slave device 3B provides an instruction for switching to the transmittable state (Talk) to the switch control transmission circuit 33 at a point t2−RTTsb in time that is obtained when a first round-trip delay time RTTsb of the slave device 3B is subtracted from the point t2 in time. Further, the TDMA control circuit 31 of the slave device 3B instructs the data transmission circuit 35 to transmit a data signal at the point t2−RTTsb. The point t2−RTTsb in time is the local time in the slave device 3B.

The above-mentioned first round-trip delay time RTTs is measured for each slave device 3. Here, the first round-trip delay times RTTs of the slave devices 3A, 3B are RTTsa, RTTsb, respectively. When transmitting a control signal for making notification of a point in time at which transmission is permitted to the slave devices 3A, 3B, the TDMA control circuit 11 of the master device 1 may also make notification of the first round-trip delay times RTTsa, RTTsb measured in regard to the respective slave devices 3A, 3B. Alternatively, the TDMA control circuit 11 may transmit the first round-trip delay times RTTsa, RTTsb to the slave devices 3A, 3B in advance. Alternatively, the TDMA control circuit 11 may notify the slave devices 3A, 3B of the points t1−RTTsa, t2−RTTsb in time that are obtained when the first round-trip delay times RTTsa, RTTsb are respectively subtracted as points in time at which transmission is permitted.

Next, in response to a switch instruction of the switch control transmission circuit 33 of the slave device 3A, after a delay time Tstxa elapses from the point t1−RTTsa in time, the transmission-reception switch 4A is switched to the transmittable state (Talk). Further, after the delay time Tstxa elapses from the point t1−RTTsa in time, the data signal transmitted from the data transmission circuit 35 of the slave device 3A is sent out to the optical network 7. Here, the delay time Tstxa is the delay period of time in the data transmission circuit 35 of the slave device 3A. The delay period of time in the switch control transmission circuit 33 of the slave device 3A is also the delay time Tstxa.

Similarly, in response to a switch instruction of the switch control transmission circuit 33 of the slave device 3B, after a delay time Tstxb elapses from the point t2−RTTsb in time, the transmission-reception switch 4B is switched to the transmittable state (Talk). Further, after the delay time Tstxb elapses from the point t2−RTTsb in time, the data signal transmitted from the data transmission circuit 35 of the slave device 3B is sent out to the optical network 7. Here, the delay time Tstxb is the delay period of time in the data transmission circuit 35 of the slave device 3B. The delay period of time in the switch control transmission circuit 33 of the slave device 3B is also the delay time Tstxb.

Next, the data reception circuit 14 of the master device 1 receives the data signal transmitted from the slave device 3A. Subsequently, the data reception circuit 14 of the master device 1 receives the data signal transmitted from the slave device 3B. Any delay period of time in a reception process of the data reception circuit 14 is Tmrx. Thus, the master device 1 receives the data signal transmitted by the slave device 3A, after a time Tstxa+Tmtx elapses from the local point t1−RTTsa in time of the slave device 3A. That is, the data signal is sent out to the optical network 7 at a point t1−Tmrx in time, which is the point in time in the master device 1, and the master device 1 receives the data signal transmitted by the slave device 3A at the point t1 in time. Further, the master device 1 receives the data signal transmitted by the slave device 3B, after a time Tstxb+Tmrx elapses from the local point t2−RTTsb in time of the slave device 3B. That is, the data signal is sent out to the optical network 7 at a point t2−Tmrx in time, which is the point in time in the master device 1, and the master device 1 receives the data signal transmitted by the slave device 3B at the point t2 in time. Because the period from the point t1 to the point t2 in time is provided to the slave device 3A as a period of time during which data is transmittable, the data signal transmitted from the slave device 3A is sent out to the optical network 7 in the period from the point t1−Tmrx to the point t2−Tmrx in time and is received in the master device 1 in the period from the point t1 to the point t2 in time. Because the period from the point t2 to the point t3 in time is provided to the slave device 3B as a period of time during which data is transmittable, the data signal transmitted from the slave device 3B is sent out to the optical network 7 in the period from the point t2−Tmrx to the point t3−Tmrx in time and is received in the master device 1 in the period from the point t2 to the point t3 in time. Therefore, when it is scheduled such that there is no collision in the master device 1, data signals transmitted from the slave devices 3A, 3B are received in the master device 1 without collision in the optical network 7.

(6) Control Procedure of Downstream Communication

Figure 8:
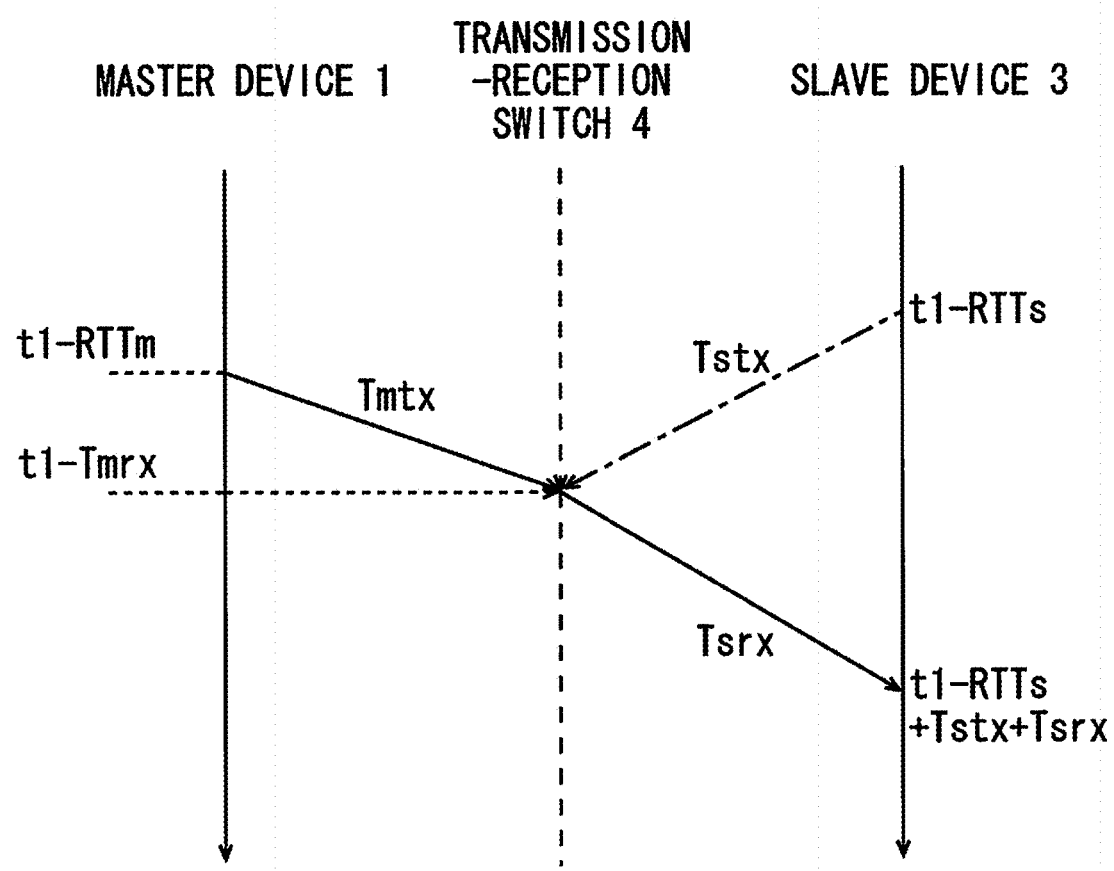
FIG. 8 is a time chart showing the timing for transmission in downstream communication.

Next, the control procedure of downstream communication in which a data signal is transmitted from the master device 1 to the slave device 3 will be described. FIG. 8 is a time chart showing the timing for transmission in downstream communication. First, the TDMA control circuit 11 of the master device 1 allocates a point in time at which a data signal is to be received to each slave device 3. In the example of FIG. 8, the TDMA control circuit 11 allocates the point t1 in time to the slave device 3. Specifically, in response to an instruction provided by the TDMA control circuit 11, the control transmission circuit 12 transmits a control signal designating the point t1 in time at which a data signal is to be received to the slave device 3.

Next, the TDMA control circuit 31 of the slave device 3 provides an instruction for switching to the receivable state (Listen) to the switch control transmission circuit 33 at a point t1−RTTs in time that is obtained when the first round-trip delay time RTTs of the slave device 3 is subtracted from the point t1 in time. The point t1−RTTs in time is the local point in time in the slave device 3. In response to this switch instruction, the switch control transmission circuit 33 switches the transmission-reception switch 4 to the receivable state (Listen). The delay period of time of the process in the switch control transmission circuit 33 is Tstx. When transmitting a control signal for making notification of a point in time at which a data signal is to be received to the slave device 3, the TDMA control circuit 11 of the master device 1 may also make notification of the first round-trip delay time RTTs measured in regard to the slave device 3. Alternatively, the TDMA control circuit 11 may transmit the first round-trip delay time RTTs to the slave device 3 in advance. Alternatively, the TDMA control circuit 11 may notify the slave device 3 of the point t1−RTTs in time that is obtained when the first round-trip delay time RTTs is subtracted as a point in time at which transmission is permitted.

Further, the TDMA control circuit 11 of the master device 1 instructs the data transmission circuit 13 to transmit a data signal at a point t1−RTTm in time that is obtained when the second round-trip delay time RTTm is subtracted from the point t1 in time. In response to this transmission instruction, the data transmission circuit 13 transmits the data signal to the slave device 3. The delay period of time of the process in the data transmission circuit 13 is Tmtx.

The transmission-reception switch 4 is switched to the receivable state (Listen) after the time Tstx elapses from the point t1−RTTs in time which is the local point in time in the slave device 3. As can be seen from FIGS. 4 and 8, the transmission-reception switch 4 is switched to the receivable state (Listen) at the point t1−Tmrx in time, which is the point in time in the master device 1. On the other hand, the data signal transmitted from the master device 1 arrives at the transmission-reception switch 4 after the time Tmtx elapses from the point t1−RTTm in time, which is the point in time in the master device 1. As can be also seen from FIGS. 6 and 8, the data signal arrives at the transmission-reception switch 4 at the point t1−Tmrx in time, which is the point in time in the master device 1. Thus, the slave device 3 can receive the data signal transmitted by the master device 1. In FIG. 8, Tsrx is the processing period of time in the data reception circuit 34 of the slave device 3.

Figure 9:
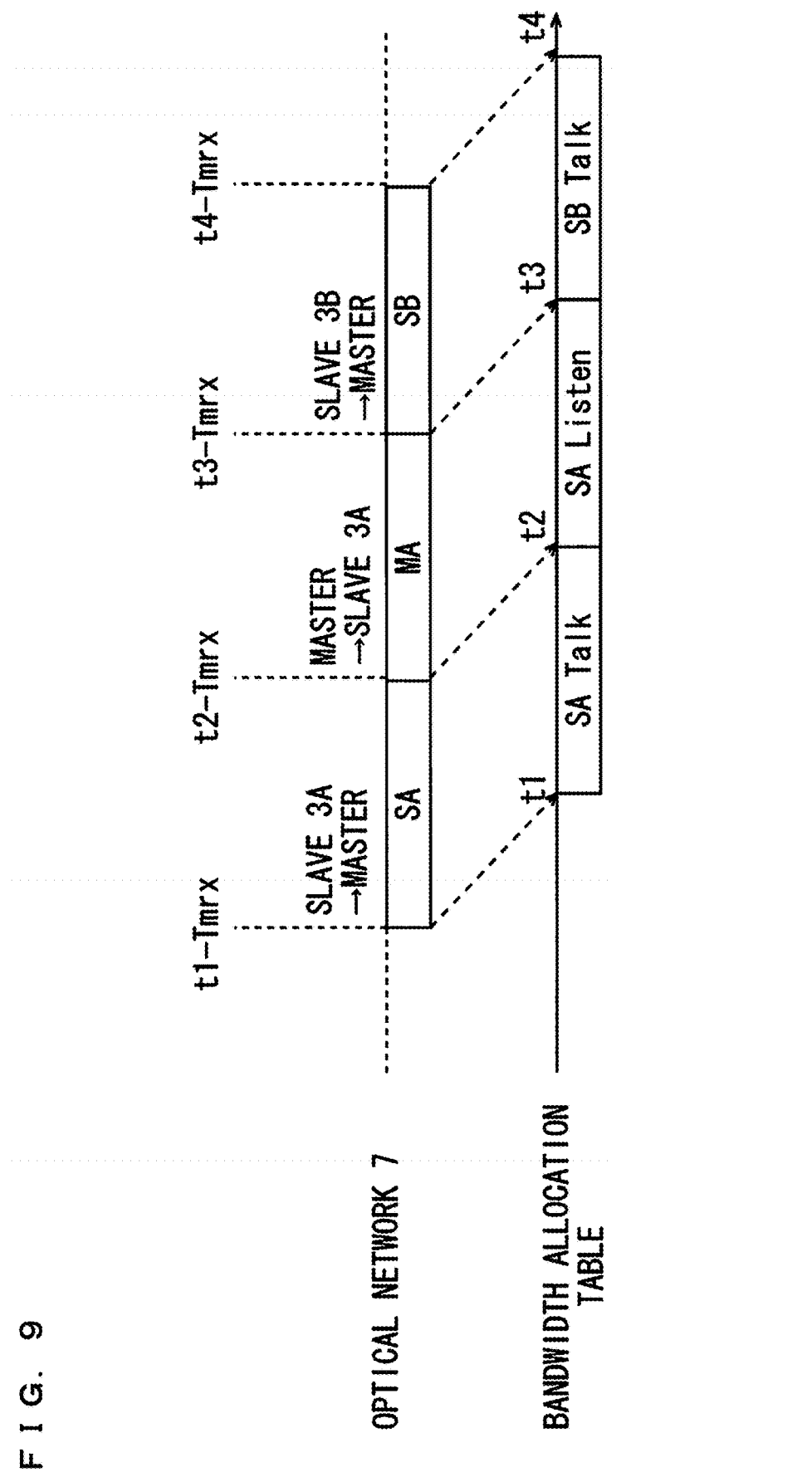
FIG. 9 is a time chart showing the timing for transmission in a case in which upstream communication and downstream communication coexist.

(7) Control Procedure in Case in Which Upstream Communication and Downstream Communication Coexist FIG. 9 is a time chart showing the timing for transmission in a case in which upstream communication and downstream communication coexist. In the example of FIG. 9, the TDMA control circuit 11 of the master device 1 allocates the period from the point t1 to the point t2 in time to the slave device 3A as a data transmittable period of time. Further, the TDMA control circuit 11 of the master device 1 allocates the period from the point t2 to the point t3 in time to the slave device 3A as a period of time during which a data signal is to be received. Further, the TDMA control circuit 11 of the master device 1 allocates the period from the point t3 to the point t4 in time to the slave device 3B as a data transmittable period of time. In FIG. 9, a symbol SA indicates a data signal transmitted by the slave device 3A to the master device 1, a symbol MA indicates a data signal transmitted by the master device 1 to the slave device 3A, and a symbol SB indicates a signal transmitted by the slave device 3B to the master device.

As described with reference to FIG. 7, in a case in which the slave device 3A is permitted to transmit data in the period from the point t1 to the point t2 in time, the data signal transmitted from the slave device 3A is sent out to the optical network 7 in the period from the point t1−Tmrx to the point t2−Tmrx in time. Similarly, in a case in which the slave device 3B is permitted to transmit data in the period from the point t3 to the point t4 in time, the data signal transmitted from the slave device 3B is sent out to the optical network 7 in the period from the point t3−Tmrx to the point t4−Tmrx in time. Further, as described with reference to FIG. 8, in a case in which the period from the point t2 to the point t3 in time is allocated to the slave device 3A as a period in which a data signal is received, the data signal transmitted to the slave device 3A is sent out to the optical network 7 in the period from the point t2−Tmrx to the point t3−Tmrx in time. In this manner, even in a case in which upstream communication and downstream communication coexist, data signals do not collide with each other with the control in the present embodiment.

[2] Second Embodiment

Figure 10:
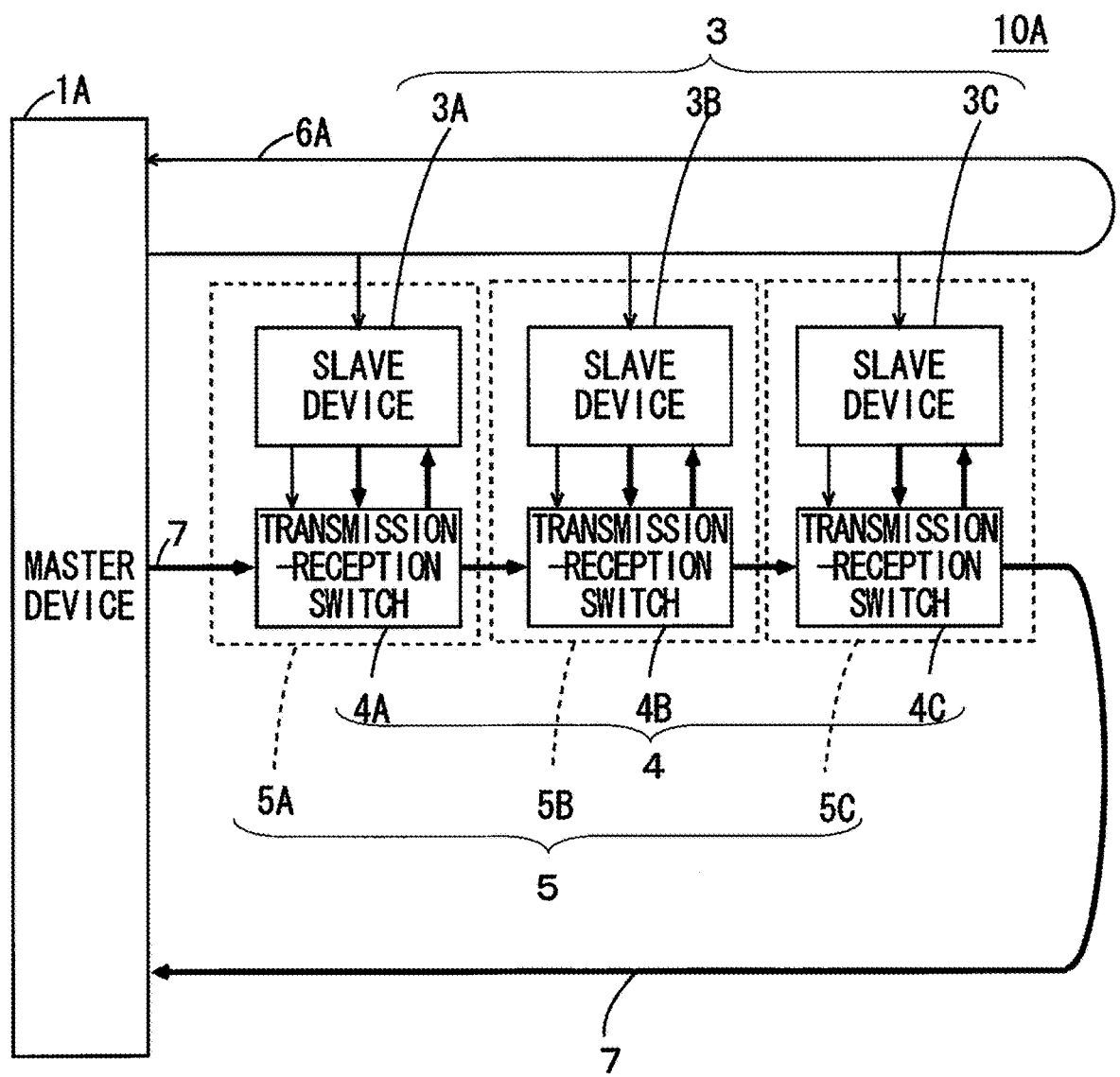
FIG. 10 is the overall view of a communication system according to a second embodiment.

Next, a communication system 10A according to a second embodiment of the present invention will be described. FIG. 10 shows the overall configuration of the communication system 10A according to the second embodiment. Unlike the communication system 10 of the first embodiment, a control network 6A included in the communication system 10A is configured to have a loop shape and is connected to each slave device 3 and then reconnected to a master device 1A. Thus, the master device 1A can receive a control signal transmitted by the master device 1A itself.

Figure 11:
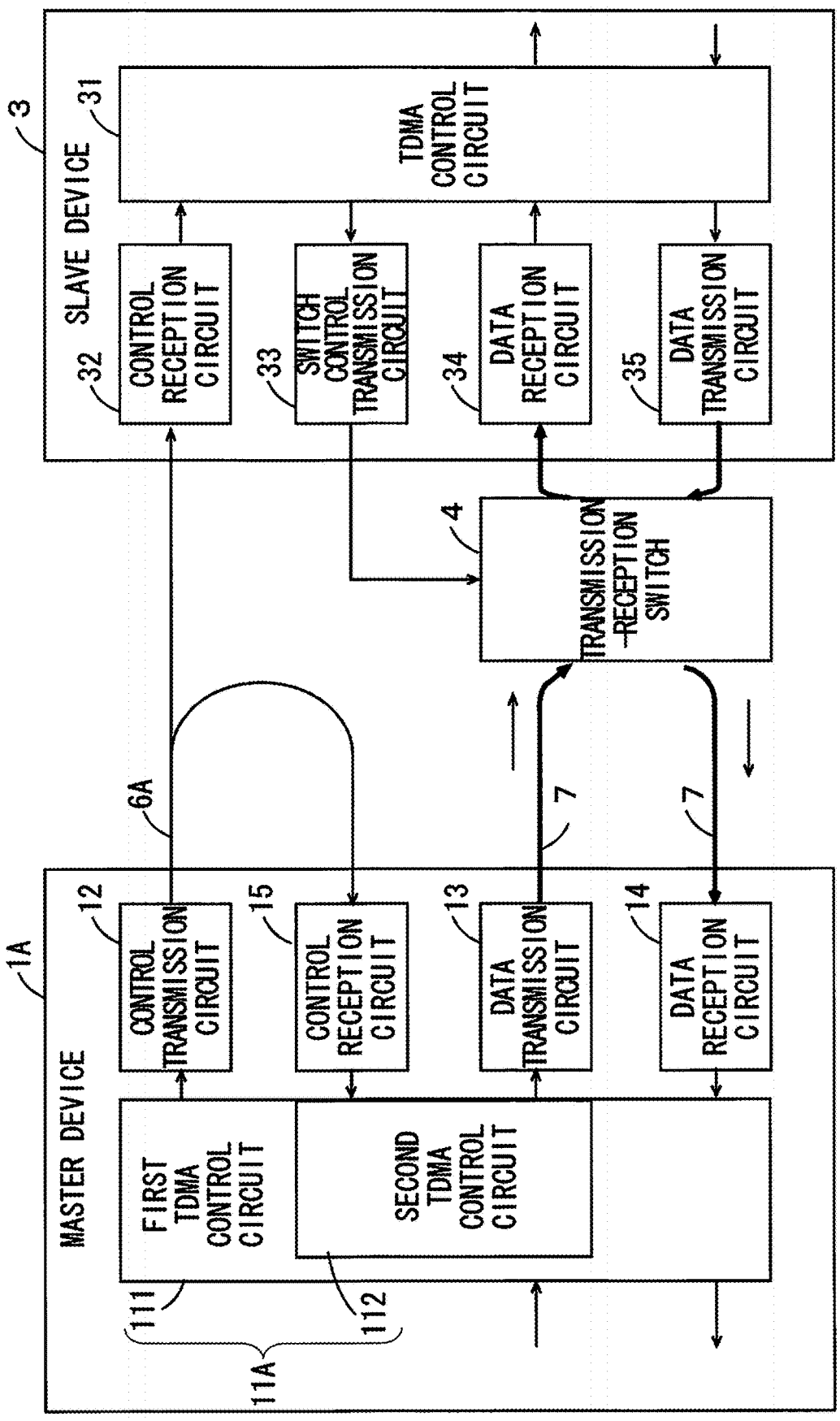
FIG. 11 is a block diagram showing the functional configurations of a master device and a slave device according to the second embodiment.

FIG. 11 is a block diagram showing the functional configurations of the master device 1A and a slave device 3 according to the second embodiment. Unlike the first embodiment, a TDMA control circuit 11A included in the master device 1A includes a first TDMA control circuit 111 and a second TDMA control circuit 112. Further, unlike the first embodiment, the master device 1A includes a control reception circuit 15. The first TDMA control circuit 111 serves to execute TDMA control as a master device, and the second TDMA control circuit 112 serves to execute TDMA control as a slave device. The control reception circuit 15 receives a control signal transmitted by a control transmission circuit 12.

Also in the communication system 10A of the second embodiment, the method of measuring a first round-trip delay time RTTs between a master device and a slave device is similar to the method described in "(3) Round-Trip Delay Time Between Master Device and Slave Device" in the first embodiment. In the second embodiment, the method of measuring a second round-trip delay time RTTm from the master device to the master device is different from the method described in the first embodiment.

Figure 12:
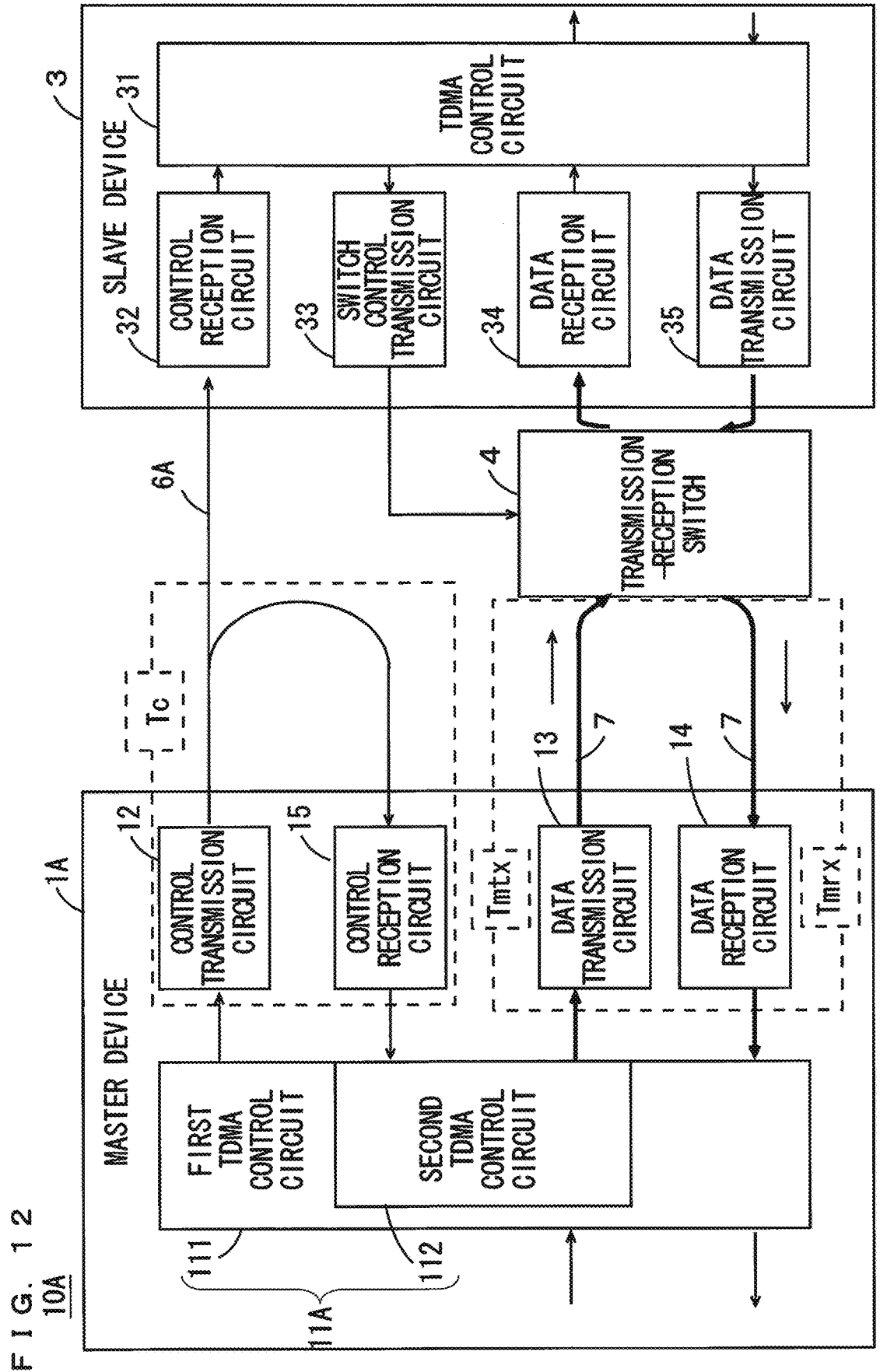
FIG. 12 is a diagram showing the round-trip delay time from the master device to the master device.

Next, the second round-trip delay time RTTm from the master device to the master device will be described. FIG. 12 is a diagram for explaining the second round-trip delay time RTTm. The second round-trip delay time RTTm is the delay period of time from the time when the master device 1A instructs the master device 1A itself to transmit a data signal to the time when the master device 1A receives the data signal transmitted by the master device 1A itself. In order to measure the second round-trip delay time RTTm, the transmission-reception switches 4 of all of the slave devices 3 are switched to the pass state (Thru).

As shown in FIG. 12, the second round-trip delay time RTTm includes three elements which are delay times Tc, Tmtx, Tmrx. The delay time Tc is the delay period of time during which a control signal transmitted from the master device 1A is received in the master device 1A, and the processing periods of time in the control transmission circuit 12 and the control reception circuit 15 are dominant terms. The delay time Tmtx is the delay period of time required for the master device 1A to transmit a data signal, and the processing period of time in the data transmission circuit 13 is a dominant term. Further, the delay time Tmrx is the delay period of time required for the master device 1A to receive a data signal, and the processing period of time in the data reception circuit 14 is a dominant term.

Figure 13:
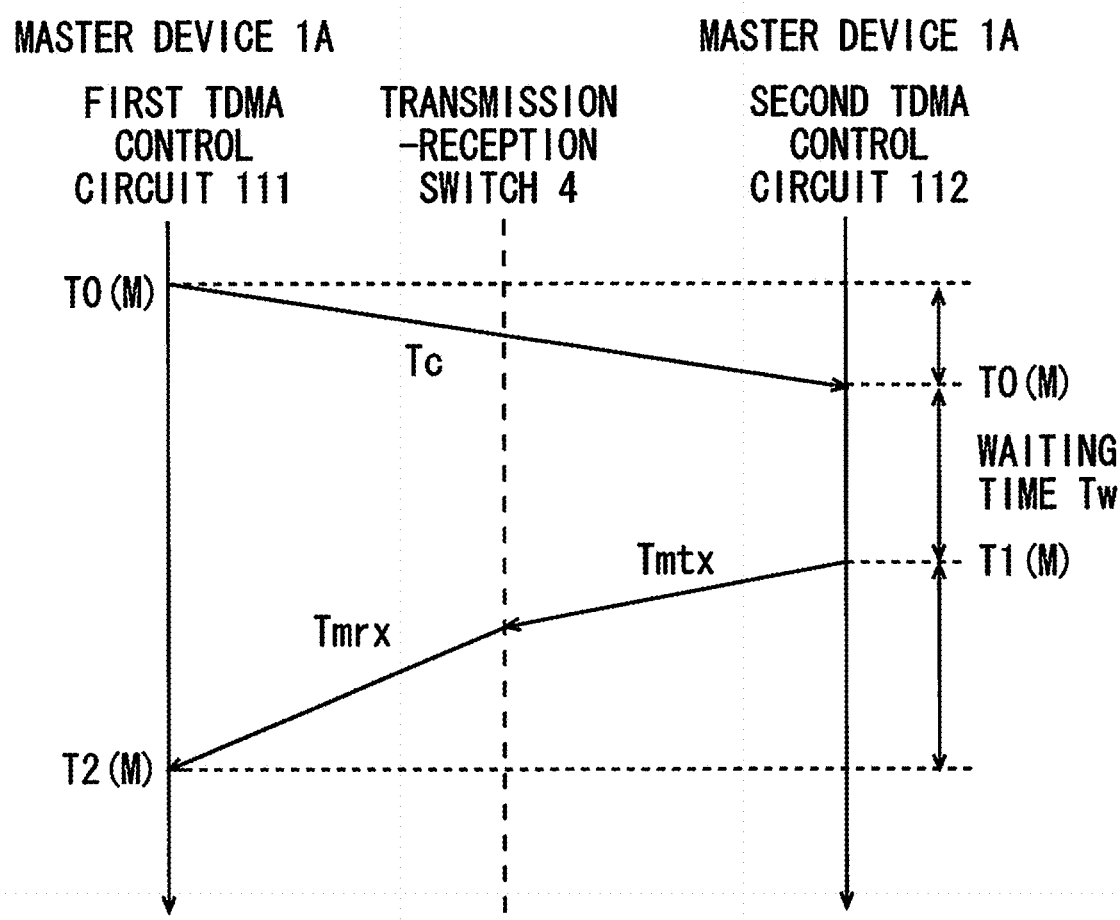
FIG. 13 is a time chart showing the round-trip delay time from the master device to the master device.

FIG. 13 is a time chart showing the second round-trip delay time RTTm. At a point T0(M) in time, the master device 1A transmits a control signal to the master device 1A. Specifically, the first TDMA control circuit 111 instructs the control transmission circuit 12 to transmit the control signal including a time stamp TS0(M) of the point T0(M) in time. The control transmission circuit 12 generates the frame of the control signal including the time stamp TS0(M) and transmits the control signal to the master device 1A. The control signal is sent out to the control network 6A. The control reception circuit 15 of the master device 1A provides the received control signal to the second TDMA control circuit 112. When receiving the control signal, the second TDMA control circuit 112 sets the local point in time in the second TDMA control circuit 112 to the TS0(M). At this time, the sum of the processing periods of time in the control transmission circuit 12 and the control reception circuit 15 is the delay time Tc. That is, the local point in time in the second TDMA control circuit 112 is delayed by the Tc from the point in time in the master device 1 (the first TDMA control circuit 111).

Subsequently, at a point T1(M) in time, the second TDMA control circuit 112 transmits a data signal to the master device 1A itself. The point T1(M) in time is the local point in time in the second TDMA control circuit 112. Specifically, the second TDMA control circuit 112 instructs the data transmission circuit 13 to transmit the data signal including a time stamp TS1(M) of the point T1(M) in time. A waiting time Tw from the point T0(M) to the point T1(M) in time is the processing period of time in the second TDMA control circuit 112. The data transmission circuit 13 generates the frame of the data signal including the time stamp TS1(M) and transmits the data signal to the master device 1A. At this time, the processing period of time in the data transmission circuit 13 is the delay time Tmtx.

The data signal transmitted from the data transmission circuit 13 is sent out to the optical network 7. The data signal passes through all of the transmission-reception switches 4 and returns to the master device 1A. The data reception circuit 14 of the master device 1A provides the received data signal to the first TDMA control circuit 111. The first TDMA control circuit 111 acquires a point T2(M) in time at which the data signal is received and its time stamp TS2(M). At this time, the processing period of time in the data reception circuit 14 is the delay time Tmrx.

The first TDMA control circuit 111 obtains the second round-trip delay time RTTm by performing the operation in the final line of the following formula.

$$RTTm = Tc + Tmtx + Tmrx$$
$$= TS2(M) - TS0(M) - Tw$$
$$= TS2(M) - TS0(M) - (TS1(M) - TS0(M))$$
$$= TS2(M) - TS1(M)$$

The first TDMA control circuit 111 saves the obtained second round-trip delay time RTTm in the storage included in the master device 1A.

In this manner, since having the second TDMA control circuit 112 serving as a slave device therein, the master device 1A in the second embodiment can measure the second round-trip delay time RTTm. Also in the second embodiment, the control procedure of upstream communication is similar to the procedure described in "(5) Control Procedure of Upstream Communication" in the first embodiment. The TDMA control circuit 31 of the slave device 3 provides an instruction for switching to the transmittable state (Talk) to the switch control transmission circuit 33 at a point in time that is obtained when the first round-trip time RTTs of the slave device 3 itself is subtracted from a point in time that is in the period allocated as a transmittable period of time. Further, the TDMA control circuit 31 of the slave device 3 instructs the data transmission circuit 35 to transmit a data signal at a point in time that is obtained when the first round-trip delay time RTTs of the slave device 3 itself is subtracted from a point in time that is in the period allocated as a transmittable period of time. Thus, in the communication system 10A of the second embodiment, it is also possible to control the upstream communication without an occurrence of collision of optical signals.

Further, in the second embodiment, the control procedure of downstream communication is similar to the procedure described in "(6) Control Procedure of Downstream Communication" in the first embodiment. The TDMA control circuit 31 of the slave device 3 provides an instruction for switching to the receivable state (Listen) to the switch control transmission circuit 33 at a point in time that is obtained when the first round-trip delay time RTTs of the slave device 3 is subtracted from a point in time that is allocated as a point in time at which a data signal is to be received. Further, the second TDMA control circuit 112 of the master device 1A instructs the data transmission circuit 13 to transmit a data signal at a point in time that is obtained when the second round-trip delay time RTTm is subtracted from a point in time that is allocated as a point in time at which a data signal is to be received in the slave device 3. Thus, in the communication system 10A of the second embodiment, it is also possible to control the downstream communication in the similar manner as described in the first embodiment.

In this manner, in the second embodiment, it is also possible to control the upstream communication and the downstream communication in the similar manner as described in the first embodiment. Therefore, even in a case in which upstream communication and downstream communication coexist, it is possible to control the upstream communication and the downstream communication in the similar manner as described in "(7) Control Procedure in Case in Which Upstream Communication and Downstream Communication Coexist" of the first embodiment.

[3] Correspondences Between Constituent Elements in Claims and Parts in Preferred Embodiment In the following paragraphs, non-limiting examples of correspondences between various elements recited in the claims below and those described above with respect to various preferred embodiments of the present disclosure are explained. In the above-mentioned embodiment, the TDMA control circuit 11 and the TDMA control circuit 11A are examples of a master TDMA control circuit, the control transmission circuit 12 is an example of a master control transmission circuit, and the data transmission circuit 13 is an example of a master data transmission circuit. Further, in the above-mentioned embodiment, the TDMA control circuit 31 is an example of a slave TDMA control circuit, and the data transmission circuit 35 is an example of a slave data transmission circuit. Further, in the above-mentioned embodiment, the control reception circuit 15 is an example of a master control reception circuit.

As each of various elements recited in the claims, various other elements having configurations or functions described in the claims can be also used.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

[4] Modified Example

While the three gateways 5A to 5C are connected as the gateway 5 in the above-mentioned embodiment by way of example, the number of the gateways 5 is not limited to this. The number of the gateways 5 may be equal to or larger than four, or may be one or two.

In "(7) Control Procedure in Case in Which Upstream Communication and Downstream Communication Coexist" in the above-mentioned embodiment, the time frames allocated to the respective slave devices 3 are close to each other as described in FIG. 9. This is merely one example, and an interval may be provided between the time frames allocated to the respective slave devices 3.

[5] Aspects of Present Invention

The communication system, the master device, the slave device and the communication method described in the above-mentioned embodiments will be clarified by the following features.

(Aspect 1) A communication system according to aspect 1 performs communication between a master device and a slave device with use of TDMA, and includes a control network for transmission of a control signal that connects the master device and the slave device to each other, and an optical network for transmission of a data signal that is reconnected from the master device to the master device through the slave device, wherein the master device includes a master TDMA control circuit, a master control transmission circuit that transmits a first control signal including a time stamp TS0(S) of a point T0(S) in time to the slave device with use of the control network, and a master data transmission circuit that transmits a first data signal including a time stamp TS0(M) of a point T0(M) in time to the master device with use of the optical network, the slave device includes a slave TDMA control circuit that sets a point in time in the slave device to the T0(S) when receiving the first control signal, and a slave data transmission circuit that, at a point T1(S) in time, transmits a second data signal including a time stamp TS1(S) of the point T1(S) in time to the master device with use of the optical network, the master TDMA control circuit acquires a point T2(S) in time at which the second data signal is received and its time stamp TS2(S) and subtracts the time stamp TS1(S) from the time stamp TS2(S) to calculate a first round-trip delay time, and acquires a point T1(M) in time at which the first data signal is received and its time stamp TS1(M) and subtracts the time stamp TS0(M) from the time stamp TS1(M) to calculate a second round-trip delay time, the master data transmission circuit transmits a data signal to the slave device at a point in time that is obtained when the second round-trip delay time is subtracted from a point TA in time that is allocated by the master TDMA control circuit, and the slave device puts the slave device in a data receivable state at a point in time that is obtained when the first round-trip delay time is subtracted from the point TA in time.

With the communication system according to aspect 1, the timing for transmission is accurately controlled in the communication mode in which a data signal is transmitted from the master device to the slave device, so that it is possible to avoid collision and loss of signals.

(Aspect 2) The communication system according to aspect 1, wherein the slave device may include a switch control transmission circuit that, at the point T1(S) in time, provides a control signal for switching the slave device to a data transmittable state to a transmission-reception switch, and the switch control transmission circuit may provide a control signal for switching the slave device to a data receivable state to the transmission-reception switch at a point in time that is obtained when the first round-trip delay time is subtracted from the point TA in time.

Because the transmission-reception switch is switched to the receivable state with use of the first round-trip delay time, the slave device can receive data.

(Aspect 3) A communication system according to aspect 3 performs communication between a master device and a slave device with use of TDMA, and includes a control network for transmission of a control signal that is reconnected from the master device to the master device through the slave device, and an optical network for transmission of a data signal that is reconnected from the master device to the master device through the slave device, wherein the master device includes a master TDMA control circuit, a master control transmission circuit that transmits a first control signal including a time stamp TS0(S) of a point T0(S) in time to the slave device with use of the control network and transmits a second control signal including a time stamp TS0(M) of a point T0(M) in time to the master device with use of the control network, a master control reception circuit that receives the second control signal, and a master data transmission circuit that transmits a first data signal including a time stamp TS1(M) of a point T1(M) in time to the master device with use of the optical network in response to reception of the second control signal by the master control reception circuit, the slave device includes a slave TDMA control circuit that sets a point in time in the slave device to the T0(S) when receiving the first control signal, and a slave data transmission circuit that transmits a second data signal including a time stamp TS1(S) of a point T1(S) in time to the master device with use of the optical network at the point T1(S) in time, the master TDMA control circuit acquires a point T2(S) in time at which the second data signal is received and its time stamp TS2(S) and subtracts the time stamp TS1(S) from the time stamp TS2(S) to calculate a first round-trip delay time, and acquires a point T2(M) in time at which the first data signal is received and its time stamp TS2(M) and subtracts the time stamp TS1(M) from the time stamp TS2(M) to calculate a second round-trip delay time, the master data transmission circuit transmits a data signal to the slave device at a point in time that is obtained when the second round-trip delay time is subtracted from a point TA in time that is allocated by the master TDMA control circuit, and the slave device puts the slave device in a data receivable state at a point in time that is obtained when the first round-trip delay time is subtracted from the point TA in time.

With the communication system according to aspect 3, the timing for transmission is accurately controlled in the communication mode in which a data signal is transmitted from the master device to the slave device, so that it is possible to avoid collision and loss of signals.

(Aspect 4) The communication system according to aspect 3, wherein the slave device may include a switch control transmission circuit that provides a control signal for switching the slave device to a data transmittable state to a transmission-reception switch at the point T1(S) in time, and the switch control transmission circuit may provide a control signal for switching the slave device to a data receivable state to the transmission-reception switch at a point in time that is obtained when the first round-trip delay time is subtracted from the point TA in time.

Because the transmission-reception switch is switched to the receivable state with use of the first round-trip delay time, the slave device can receive data.

(Aspect 5) The communication system according to aspect 1 or 3, wherein the slave device may put the slave device in a data transmittable state at a point in time that is obtained when the first round-trip delay time is subtracted from a point TB in time that is allocated by the master TDMA control circuit.

With the communication system according to aspect 5, the timing for transmission is accurately controlled in the communication mode in which a data signal is transmitted from the slave device to the master device, so that it is possible to avoid collision and loss of signals.

(Aspect 6) The communication system according to aspect 2 or 4, wherein the switch control transmission circuit may provide a control signal for switching the slave device to a data transmittable state at a point in time that is obtained when the first round-trip delay time is subtracted from a point TB in time that is allocated by the slave TDMA control circuit, and the slave data transmission circuit may transmit a data signal to the master device with use of the optical network at a point in time that is obtained when the first round-trip delay time is subtracted from the point TB in time.

With the communication system according to aspect 6, the timing for transmission is accurately controlled in the communication mode in which a data signal is transmitted from the slave device to the master device, so that it is possible to avoid collision and loss of signals.

(Aspect 7) A master device that is used in the communication system according to aspect 1 or 3.

(Aspect 8) A slave device that is used in the communication system according to aspect 1 or 3.

(Aspect 9) A communication method according to aspect 9 of performing communication between a master device and a slave device with use of TDMA in a communication system comprising a control network for transmission of a control signal that connects the master device and the slave device to each other and an optical network for transmission of a data signal that is reconnected from the master device to the master device through the slave device includes, in the master device, transmitting a first control signal including a time stamp TS0(S) of a point T0 in time to the slave device with use of the control network, in the master device, transmitting a first data signal including a time stamp TS0(M) of a point T0(M) in time to the master device with use of the optical network, setting a point in time in the slave device to the T0(S) when the slave device receives the first control signal, in the slave device, transmitting a second data signal including a time stamp TS1(S) of a point T1(S) in time to the master device with use of the optical network at the point T1(S) in time, in the master device, acquiring a point T2(S) in time at which the second data signal is received and its time stamp TS2(S) and subtracting the time stamp TS1(S) from the time stamp TS2(S) to calculate a first round-trip delay time, and acquiring a point T1(M) in time at which the first data signal is received and its time stamp TS1(M) and subtracting the time stamp TS0(M) from the time stamp TS1(M) to calculate a second round-trip delay time, in the master device, allocating a point TA in time to the slave device when a data signal is transmitted to the slave device, in the master device, transmitting a data signal to the slave device at a point in time that is obtained when the second round-trip delay time is subtracted from the point TA in time, and in the slave device, putting the slave device in a data receivable state at a point in time that is obtained when the first round-trip delay time is subtracted from the point TA in time.

With the communication method according to aspect 9, the timing for transmission is accurately controlled in the communication mode in which a data signal is transmitted from the master device to the slave device, so that it is possible to avoid collision and loss of signals.

(Aspect 10) A communication method according to aspect 10 of performing communication between a master device and a slave device with use of TDMA in a communication system comprising a control network for transmission of a control signal that is reconnected from the master device to the master device through the slave device and an optical network for transmission of a data signal that is reconnected from the master device to the master device through the slave device, includes, in the master device, transmitting a first control signal including a time stamp TS0(S) of a point T0 in time to the slave device with use of the control network, in the master device, transmitting a second control signal including a time stamp TS0(M) of a point T0(M) in time to the master device with use of the control network, in the master device, receiving the second control signal, in the master device, transmitting a first data signal including a time stamp TS1(M) of a point T1(M) in time to the master device with use of the optical network in response to reception of the second control signal, setting a point in time in the slave device to the T0(S) when the slave device receives the first control signal, in the slave device, transmitting a second data signal including a time stamp TS1(S) of a point T1(S) in time to the master device with use of the optical network at the point T1(S) in time, in the master device, acquiring a point T2(S) in time at which the second data signal is received and its time stamp TS2(S) and subtracting the time stamp TS1(S) from the time stamp TS2(S) to calculate a first round-trip delay time, and acquiring a point T2(M) in time at which the first data signal is received and its time stamp TS2(M) and subtracting the time stamp TS1(M) from the time stamp TS2(M) to calculate a second round-trip delay time, in the master device, allocating a point TA in time to the slave device when a data signal is transmitted to the slave device, in the master device, transmitting a data signal to the slave device at a point in time that is obtained when the second round-trip delay time is subtracted from the point TA in time, and in the slave device, putting the slave device in a data receivable state at a point in time that is obtained when the first round-trip delay time is subtracted from the point TA in time.

With the communication system according to aspect 10, the timing for transmission is accurately controlled in the communication mode in which a data signal is transmitted from the master device to the slave device, so that it is possible to avoid collision and loss of signals.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. A communication system that performs communication between a master device and a slave device with use of TDMA, comprising:
   a control network for transmission of a control signal that connects the master device and the slave device to each other; and
   an optical network for transmission of a data signal that is reconnected from the master device to the master device through the slave device, wherein
   the master device includes
   a master TDMA control circuit,
   a master control transmission circuit that transmits a first control signal including a time stamp TS0(S) of a point T0(S) in time to the slave device with use of the control network, and
   a master data transmission circuit that transmits a first data signal including a time stamp TS0(M) of a point T0(M) in time to the master device with use of the optical network,
   the slave device includes
   a slave TDMA control circuit that sets a point in time in the slave device to the T0(S) when receiving the first control signal, and
   a slave data transmission circuit that, at a point T1(S) in time, transmits a second data signal including a time stamp TS1(S) of the point T1(S) in time to the master device with use of the optical network,
   the master TDMA control circuit
   acquires a point T2(S) in time at which the second data signal is received and its time stamp TS2(S) and subtracts the time stamp TS1(S) from the time stamp TS2(S) to calculate a first round-trip delay time, and acquires a point T1(M) in time at which the first data signal is received and its time stamp TS1(M) and subtracts the time stamp TS0(M) from the time stamp TS1(M) to calculate a second round-trip delay time,
   the master data transmission circuit
   transmits a data signal to the slave device at a point in time that is obtained when the second round-trip delay time is subtracted from a point TA in time that is allocated by the master TDMA control circuit, and
   the slave device puts the slave device in a data receivable state at a point in time that is obtained when the first round-trip delay time is subtracted from the point TA in time.

2. The communication system according to claim 1, wherein
   the slave device
   includes a switch control transmission circuit that, at the point T1(S) in time, provides a control signal for switching the slave device to a data transmittable state to a transmission-reception switch, and
   the switch control transmission circuit
   provides a control signal for switching the slave device to a data receivable state to the transmission-reception switch at a point in time that is obtained when the first round-trip delay time is subtracted from the point TA in time.

3. The communication system according to claim 1, wherein
   the slave device puts the slave device in a data transmittable state at a point in time that is obtained when the first round-trip delay time is subtracted from a point TB in time that is allocated by the master TDMA control circuit.

4. The communication system according to claim 2, wherein
   the switch control transmission circuit
   provides a control signal for switching the slave device to a data transmittable state at a point in time that is obtained when the first round-trip delay time is subtracted from a point TB in time that is allocated by the slave TDMA control circuit, and
   the slave data transmission circuit
   transmits a data signal to the master device with use of the optical network at a point in time that is obtained when the first round-trip delay time is subtracted from the point TB in time.

5. A master device that is used in the communication system according to claim 1.

6. A slave device that is used in the communication system according to claim 1.

7. A communication system that performs communication between a master device and a slave device with use of TDMA, comprising:
   a control network for transmission of a control signal that is reconnected from the master device to the master device through the slave device; and
   an optical network for transmission of a data signal that is reconnected from the master device to the master device through the slave device, wherein
   the master device includes
   a master TDMA control circuit,
   a master control transmission circuit that transmits a first control signal including a time stamp TS0(S) of a point T0(S) in time to the slave device with use of the control network and transmits a second control signal including a time stamp TS0(M) of a point T0(M) in time to the master device with use of the control network,
   a master control reception circuit that receives the second control signal, and
   a master data transmission circuit that transmits a first data signal including a time stamp TS1(M) of a point T1(M) in time to the master device with use of the optical network in response to reception of the second control signal by the master control reception circuit, the slave device includes
a slave TDMA control circuit that sets a point in time in the slave device to the T0(S) when receiving the first control signal, and
a slave data transmission circuit that transmits a second data signal including a time stamp TS1(S) of a point T1(S) in time to the master device with use of the optical network at the point T1(S) in time,
the master TDMA control circuit
acquires a point T2(S) in time at which the second data signal is received and its time stamp TS2(S) and subtracts the time stamp TS1(S) from the time stamp TS2(S) to calculate a first round-trip delay time, and acquires a point T2(M) in time at which the first data signal is received and its time stamp TS2(M) and subtracts the time stamp TS1(M) from the time stamp TS2(M) to calculate a second round-trip delay time,
the master data transmission circuit
transmits a data signal to the slave device at a point in time that is obtained when the second round-trip delay time is subtracted from a point TA in time that is allocated by the master TDMA control circuit, and
the slave device puts the slave device in a data receivable state at a point in time that is obtained when the first round-trip delay time is subtracted from the point TA in time.

8. The communication system according to claim 7, wherein
the slave device
includes a switch control transmission circuit that provides a control signal for switching the slave device to a data transmittable state to a transmission-reception switch at the point T1(S) in time, and
the switch control transmission circuit provides a control signal for switching the slave device to a data receivable state to the transmission-reception switch at a point in time that is obtained when the first round-trip delay time is subtracted from the point TA in time.

9. The communication system according to claim 7, wherein
the slave device puts the slave device in a data transmittable state at a point in time that is obtained when the first round-trip delay time is subtracted from a point TB in time that is allocated by the master TDMA control circuit.

10. The communication system according to claim 8, wherein
the switch control transmission circuit
provides a control signal for switching the slave device to a data transmittable state at a point in time that is obtained when the first round-trip delay time is subtracted from a point TB in time that is allocated by the slave TDMA control circuit, and
the slave data transmission circuit
transmits a data signal to the master device with use of the optical network at a point in time that is obtained when the first round-trip delay time is subtracted from the point TB in time.

11. A master device that is used in the communication system according to claim 7.

12. A slave device that is used in the communication system according to claim 7.

13. A communication method of performing communication between a master device and a slave device with use of TDMA in a communication system comprising a control network for transmission of a control signal that connects the master device and the slave device to each other and an optical network for transmission of a data signal that is reconnected from the master device to the master device through the slave device, including:
in the master device, transmitting a first control signal including a time stamp TS0(S) of a point T0(S) in time to the slave device with use of the control network;
in the master device, transmitting a first data signal including a time stamp TS0(M) of a point T0(M) in time to the master device with use of the optical network;
setting a point in time in the slave device to the T0(S) when the slave device receives the first control signal;
in the slave device, transmitting a second data signal including a time stamp TS1(S) of a point T1(S) in time to the master device with use of the optical network at the point T1(S) in time;
in the master device, acquiring a point T2(S) in time at which the second data signal is received and its time stamp TS2(S) and subtracting the time stamp TS1(S) from the time stamp TS2(S) to calculate a first round-trip delay time, and acquiring a point T1(M) in time at which the first data signal is received and its time stamp TS1(M) and subtracting the time stamp TS0(M) from the time stamp TS1(M) to calculate a second round-trip delay time;
in the master device, allocating a point TA in time to the slave device when a data signal is transmitted to the slave device;
in the master device, transmitting a data signal to the slave device at a point in time that is obtained when the second round-trip delay time is subtracted from the point TA in time; and
in the slave device, putting the slave device in a data receivable state at a point in time that is obtained when the first round-trip delay time is subtracted from the point TA in time.

14. A communication method of performing communication between a master device and a slave device with use of TDMA in a communication system comprising a control network for transmission of a control signal that is reconnected from the master device to the master device through the slave device and an optical network for transmission of a data signal that is reconnected from the master device to the master device through the slave device, including:
in the master device, transmitting a first control signal including a time stamp TS0(S) of a point T0(S) in time to the slave device with use of the control network;
in the master device, transmitting a second control signal including a time stamp TS0(M) of a point T0(M) in time to the master device with use of the control network;
in the master device, receiving the second control signal;
in the master device, transmitting a first data signal including a time stamp TS1(M) of a point T1(M) in time to the master device with use of the optical network in response to reception of the second control signal;
setting a point in time in the slave device to the T0(S) when the slave device receives the first control signal;
in the slave device, transmitting a second data signal including a time stamp TS1(S) of a point T1(S) in time to the master device with use of the optical network at the point T1(S) in time;
in the master device, acquiring a point T2(S) in time at which the second data signal is received and its time stamp TS2(S) and subtracting the time stamp TS1(S) from the time stamp TS2(S) to calculate a first round-trip delay time, and acquiring a point T2(M) in time at which the first data signal is received and its time stamp TS2(M) and subtracting the time stamp TS1(M) from the time stamp TS2(M) to calculate a second round-trip delay time;

in the master device, allocating a point TA in time to the slave device when a data signal is transmitted to the slave device;

in the master device, transmitting a data signal to the slave device at a point in time that is obtained when the second round-trip delay time is subtracted from the point TA in time; and in the slave device, putting the slave device in a data receivable state at a point in time that is obtained when the first round-trip delay time is subtracted from the point TA in time.

* * * * *